March 10, 1959 — P. G. KURRE — 2,876,649
LUBRICATION FOR THE MOVABLE DISK OF VARIABLE PITCH SHEAVES
Filed June 20, 1956
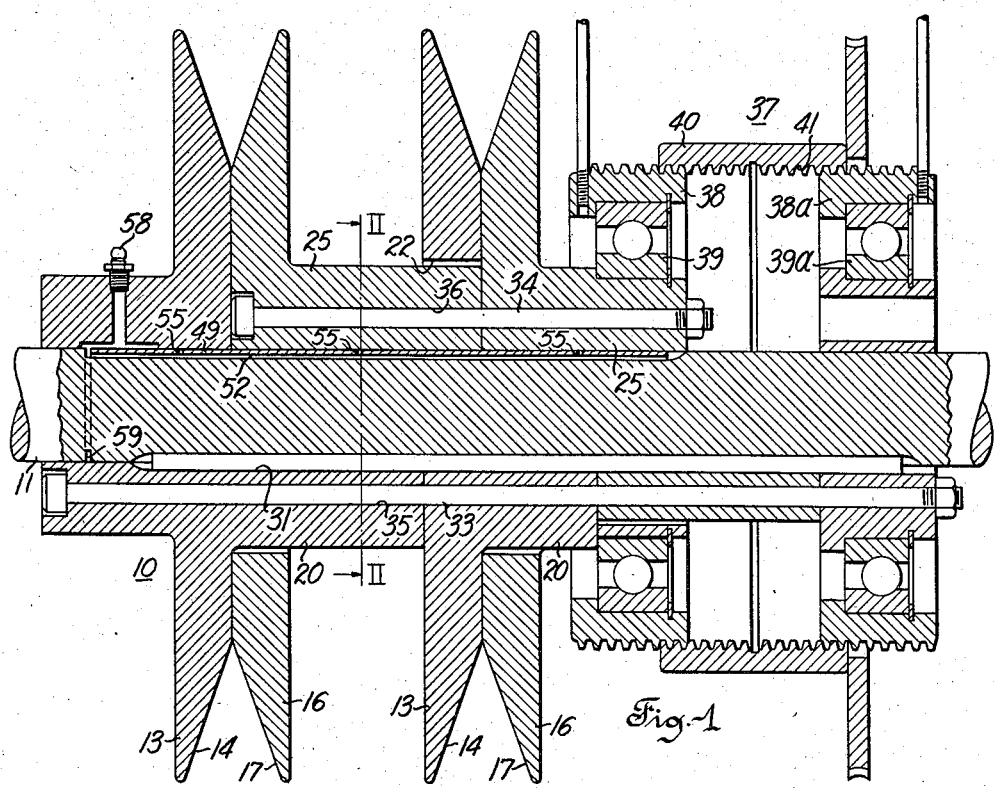
Fig. 1
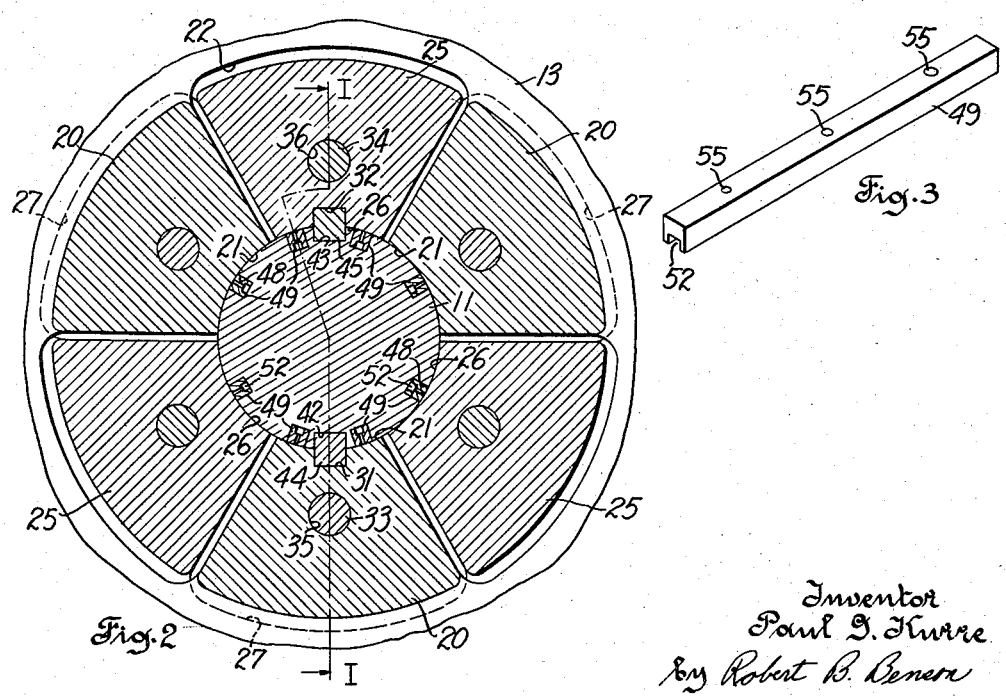
Fig. 2
Fig. 3
Inventor
Paul G. Kurre
By Robert B. Benson
Attorney United States Patent Office 2,876,649
Patented Mar. 10, 1959

2,876,649

LUBRICATION FOR THE MOVABLE DISK OF VARIABLE PITCH SHEAVES

Paul G. Kurre, Cincinnati, Ohio, assignor to Allis-Chalmers Manufacturing Company, Milwaukee, Wis.

Application June 20, 1956, Serial No. 592,550

7 Claims. (Cl. 74—230.17)

This invention relates generally to the lubrication of rotating elements having relatively movable members mounted thereon. More specifically this invention relates to the lubrication of the internal surface of axially movable disks mounted on a variable pitch diameter sheave.

In variable pitch diameter sheaves having axially movable disks forming belt engaging grooves it is very important to keep these disks properly lubricated during the operation of the sheave. If the disks are not properly lubricated fretting corrosion occurs where the disks are mounted on the shaft or other rotating member. The fretting corrosion builds up and makes it extremely difficult and often impossible to move the disk axially along the shaft to vary the pitch diameter of the sheave. It is also important when lubricating the disks of a variable pitch sheave to keep the lubrication from leaking out and being thrown on to the V-belts. If the lubricant is thrown on the V-belts the belts slide and slip in the grooves of the sheave thereby reducing the efficiency of the drive and the effective operation of the sheave. Furthermore if the lubricant gets on the belts it is very difficult to maintain a close speed control on the sheave.

Many attempts have been made in the prior art to devise an efficient system for adequately lubricating the axially movable disks of the variable pitch diameter sheave while at the same time preventing excessive leakage of the lubricant. One of the most successful methods known in the prior art has been that of using driving keys having longitudinally extending lubricant channels. Lubricant is forced from the lubricant channel outwardly through a plurality of longitudinally spaced metering holes in the driving key to the keyway in the disk. The lubricant then flows around the key and inwardly to the surface of the bore in the disk to be lubricated. The problem with such a lubrication system is that it is difficult to force the lubricant inwardly from the keyway in the disk to the surface of the disk bearing on the shaft to lubricate that portion of the disk because the lubricant pressure is operating to force the lubricant inwardly against the outwardly directed centrifugal force generated in the sheave. Furthermore, the lubricant travels axially along the keyway in the disks and around the sides of the driving key so that some of the lubricant leaks out between the disks on the sheave. The lubricant is then thrown out on the V-belts engaging the sheave by centrifugal force.

The sheave of this invention attempts to overcome the problems of the aforementioned sheave lubrication system by calling for a shaft having a plurality of inlaid keys positioned in keyways arcuately spaced around the periphery of the shaft. Each key has a longitudinally extending lubricant carrying channel on its inner side and a plurality of longitudinally spaced metering holes extending from the channel to the outer surface of the key. These inlaid keys in effect become an integral part of the shaft and their outer surface is flush with the cylindrical surface of the shaft. The inlaid keys are positioned so that the metering holes are positioned under the axially extending bearing lugs of the disks to supply lubricant directly to the surface of the disk to be lubricated. The sizes of the metering holes are graduated to provide an even distribution of lubricant to the surfaces to be lubricated regardless of the position of the metering hole relative to the source of the lubricant. To this end the metering holes closest to the source of the lubricant are smaller than the metering holes further away so that an equal amount of lubricant will flow through each metering hole.

In the sheave of this invention the metering holes are so positioned that the lubricant is metered out directly on to the surface to which it is desired to lubricate. On the other hand in the prior art sheave described above the lubricant was forced into the keyway in the hub of the disk and was then forced around the key and back to the surface which it is desired to lubricate.

In most variable pitch diameter sheaves only one driving key is required for each set of disks. However, in the prior art sheave lubrication system such as the one described above a separate driving key is required for each area which it is desired to lubricate. In applicant's lubrication system only one driving key would be required for each set of axially movable disks. Since each disk usually has three or four bearing lugs an inlaid key could be positioned under the bearing lugs desired to be lubricated and in which a driving key is not required. Hence, a sheave having the lubrication system of this invention would be cheaper and easier to manufacture than similar prior art sheaves.

Therefore, it is the object of this invention to provide a new and improved lubrication system for rotating power transmission members having relatively movable parts mounted thereon.

Another object of this invention is to provide a new and improved lubrication system for variable pitch diameter sheaves.

Another object of this invention is to provide a new and improved lubrication system for variable pitch diameter sheaves which is more efficient and has less leakage of lubricant than prior art lubrication systems.

Another object of this invention is to provide a new and improved lubrication system for variable pitch diameter sheaves in which the lubricant is distributed in equal quantities to the surfaces desired to be lubricated.

Another object of this invention is to provide a new and improved lubrication system for variable pitch diameter sheaves which is cheaper and easier to manufacture than similar prior art sheaves.

Objects and advantages other than those set forth above will be apparent from the following description when read in connection with the accompanying drawings, in which:

Fig. 1 is a longitudinal cross sectional view of the sheave of this invention taken along the line I—I of Fig. 2;

Fig. 2 is a cross sectional view of the sheave shown in Fig. 1 and taken along the line II—II of Fig. 1; and Fig. 3 is an enlarged and foreshortened isometric view of one of the inlaid keys shown in Figs. 1 and 2.

Referring now in particular to the drawings, the lubrication system of this invention is illustrated in Fig. 1 in connection with a multiple groove variable pitch diameter sheave for use in a multispeed V-belt drive. The sheave shown in Fig. 1 is what is known as an integral shaft sheave. An integral shaft sheave is one in which the disks forming the V-belt engaging grooves are mounted directly on the rotating shaft. In the sheave 10 of this invention the shaft 11 constitutes a generally cylindrical power transmission element. Upon this shaft 11 are mounted a group of similarly facing sheave disks 13 having frusto-conical faces 14 and a second group of oppositely facing sheave disks 16 with frusto-conical faces 17. The two groups of disks 13 and 16 are relatively movable axially on the shaft 11 and are alternatively arranged to form cooperating pairs of oppositely facing disks 13 and 16 with opposed frusto-conical faces 14 and 17. The disks 13 and 16 are relatively movable toward and away from each other to expand and contract the effective pitch diameter of the sheave with reference to a given size of V-belt or other interposed frictional drive element not shown.

Certain of the disks 13 are formed with arcuate axially extending bearing lugs 20 which are circumferentially spaced forming an annular series. The inner arcuate surfaces 21 of these lugs 20 fit the cylindrical external surface of the shaft 11 in axially slidable relation. Each disk 13 having such lugs 20 is apertured as at 22 between such lugs 20 to a size larger than the size of the lugs 20.

Certain of the disks 16 are formed with a series of arcuately spaced lugs 25, similar to the lugs 20 and have similar bearing surfaces 26. Each of these disks 16 is apertured as at 27, between the lugs 25 to a size larger than the lugs 25. In assembly each series of lugs 20, 25 is interdigitated and passes through the apertures 22, 27 between the series of lugs on an adjacent disk.

A longitudinally extending keyway 31 is formed in one set of axially aligned lugs 20 of the disks 13 for receiving a power transmission key. A similar keyway 32 is formed in one set of the axially aligned lugs 25 of the disks 16 for receiving a power transmission key. If desired similar keyways for driving keys can be formed in each set of axially aligned lugs.

The lugs 20, 25 serve as spacer struts between the individual disks of a set. Suitable tie bolts 33 and 34 are passed through suitable holes 35, 36 in the disks 13, 16 and lugs 20, 25 of their respective sets and serve to fix the relative axial position of each disk in a set relative to the others so that the two sets of disks are movable as units relative to each other axially on the shaft.

The position of the disks on the shaft may be varied in any of a number of well known ways but in the illustrated sheave an adjusting mechanism 37 is provided for moving the sets of disks axially along the shaft relative to each other. The adjusting mechanism 37 comprises a pair of externally threaded members 38, 38a, a pair of antifriction bearings 39, 39a and an adjusting collar 40. One of the members 38 is connected to an extension of the hub of one of the disks 16 by the bearing 39 to mount the member 38 on the set of disks 16 for imparting axial movement to the set. The other member 38a is connected to the hub of one of the disks 13 by the bearing 39 and the bolt 33 for imparting axial movement to the set of disks 13. One of the members has a right hand thread and the other member has a left hand thread. The adjusting collar 40 has a threaded bore 41 which operatively engages both members 38 and 38a. Rotation of the collar in one direction causes the members 38 and 38a to converge axially toward each other while rotation of the collar in the other direction causes the members to move axially away from each other. The axial motion of the members 38 and 38a is imparted to the sets of disks 16 and 13, respectively, to vary the effective pitch diameter of the sheave.

The lugs 20 and 25 are so proportioned and positioned on the shaft 11 that the disks 13 and 16 and their lugs 20, 25 can only move axially through a distance substantially less than the lug length. Thus certain points or circumferentially spaced areas on the external cylindrical surface of the shaft will be normally covered by the inner arcuate bearing surfaces of the lugs 20, 25.

The shaft 11 has a plurality of longitudinally extending keyways arcuately spaced around the periphery. The keyways 42 and 43 are for receiving the driving keys 44 and 45 which extend from the keyways in the shaft to the keyways 31, 32, respectively, in the axially extending lugs. The other keyways 48 are for receiving inlaid lubrication keys 49 and are positioned directly underneath the axially extending lugs 20, 25. Keyways for inlaid lubrication keys 49 are positioned on either side of the driving keys 44, 45 to lubricate the lugs 20, 25 containing the driving keys. Only one keyway 48 and inlaid key 49 is provided to lubricate each of the other lugs.

The inlaid keys 49 and their respective keyways 48 cooperate to form longitudinally extending lubricant passages in the shaft 11. To this end the inlaid keys 49 are undercut throughout their entire length so as to form with the keyways 48 in the shaft a longitudinally extending lubricant channel 52. An alternative arrangement would be to cut a groove in the bottom of the keyways 48. In either case the object is to provide a longitudinally extending lubricant channel having no outlets except at the desired places.

The inlaid keys 49 have a plurality of longitudinally spaced metering holes 55. These metering holes extend from the undercut portion of the inlaid keys 49 to the surface of the key which is positionable adjacent the bearing surfaces 21, 26 of the axially movable disks 13, 16. The keys 49 are placed in the shaft 11 so that the metering holes 55 are positioned immediately beneath the internal bearing surfaces 21, 26 of the axially extending lugs 20, 25 so that the areas desired to be lubricated are immediately above the metering hole. The quantity of lubricant flowing through a given opening is proportional to the pressure on the lubricant and the size of the opening. Therefore the smaller metering holes 55 are positioned where the pressure on the lubricant is higher to insure that an equal amount of lubricant is forced through each metering hole. To this end the diameter of the metering hole closest to the source of the lubricant is smallest in diameter and the metering hole farthest away from the source of the lubricant is the largest in diameter. The size of the intermediate metering holes are graduated accordingly so that an equal amount of lubricant is forced through each metering hole regardless of its position along the inlaid key.

In the sheave of this invention the lubricant escapes from the channel 52 through the metering holes 55 rather than around the shaft. Hence the amount of leakage around the key is diminished to a minimum and there is considerably less leakage than in prior art sheaves. The reason for this is that the lubricant will flow through the path of least resistance which in this case is through the metering holes 55 in the inlaid keys 49. Since the metering holes 55 in the keys 49 are positioned in a centrally located spot beneath the bearing surface of the axially extending lugs, the lubricant flows to the surfaces to be lubricated with a minimum amount of leakage.

The lubricant can be brought into the lubricant channels 52 of the sheave 10 by any suitable means. However, in this application the lubricant is forced into the sheave 10 through the lubricant fittings such as the fitting 58 positioned at one end of the sheave. These fittings 58 are in communication with an annular groove 59 in the shaft 11 which in turn is in communication with all of the longitudinally extending lubricant channels 52.

In operation, the lubricant is initially brought into the sheave through the fittings 58 and into the annular groove 59 around the periphery of the shaft 11. As the lubricant builds up in the annular groove 59 it is forced down through the channels 52 formed in the keyways 48 by the undercut portions of the inlaid keys 49. The lubricant is then forced outward through the metering holes 55 to the internal surface of the axially extending lugs to lubricate those surfaces which are bearing on the shaft.

It will be understood that the details of the embodiment of the invention described hereinabove and illustrated in the drawings are by way of example only and that the lubrication systems will be capable of beneficial use in mechanism other than sheaves. It will also be understood that modifications of details and substitutions of substantial equivalents may be made without departing from the spirit and teachings hereof, and that the invention is accordingly intended to include whatever lies within the legitimate scope of the appended claims.

What is claimed is:

1. A lubrication system for rotating elements comprising: a rotatable element having a plurality of arcuately spaced longitudinally extending keyways in its outer surface, a power transmission member mounted on said element and being movable relative thereto, said transmission member defining a longitudinally extending keyway in its inner surface, a driving key positioned in one of said keyways in said element and extending into said keyway in said member to transmit power from said element to said member, a plurality of inlaid keys positioned in said other keyways in said element, each of said inlaid keys combining with the bottom of its respective said keyway to define a longitudinally extending lubricant channel, each of said inlaid keys having a plurality of longitudinally spaced metering holes defined therein, said metering holes extending from the surface of said key adjacent said member to said lubrication channel, means for supplying lubricant to said channels, whereby lubrication is forced into said channel and through said metering holes to lubricate the internal surface of said member.

2. A lubrication system for rotating elements comprising: a rotatable element having a plurality of arcuately spaced longitudinally extending keyways in its outer surface, a plurality of power transmission members mounted on said element, some of said members being movable relative to said element, said transmission members combining to define a longitudinally extending keyway in their inner surface, a driving key positioned in one of said keyways in said element and extending into said keyway in said members to transmit power from said element to said members, a plurality of inlaid keys positioned in said other keyways in said element, each of said inlaid keys being undercut throughout its entire length and combining with the bottom of its respective said keyway to define a longitudinally extending lubricant channel, each of said inlaid keys having a plurality of longitudinally spaced metering holes defined therein, said metering holes extending from the surface of said key adjacent said members to said lubrication channel, means for supplying lubricant to said channels, whereby lubrication is forced into said channel and through said metering holes to lubricate the internal surface of said member.

3. A lubrication system for rotating elements comprising: a rotatable shaft having a plurality of arcuately spaced longitudinally extending keyways in its outer surface, a plurality of power transmission members mounted on said shaft and combining to form a variable pitch diameter sheave, some of said members being movable relative to said shaft and to each other to vary the effective pitch diameter of said sheave, some of said transmission members combining to define a longitudinally extending keyway in their inner surface, a driving key positioned in one of said keyways in said shaft and extending into said keyway in said members to transmit power from said shaft to said members, a plurality of inlaid keys positioned in said other keyways in said shaft, each of said inlaid keys being undercut throughout its entire length and combining with the bottom of its respective said keyway to define a longitudinally extending lubricant channel, each of said inlaid keys having a plurality of longitudinally spaced metering holes defined therein, said metering holes extending from the surface of said key adjacent said member to said lubrication channel, means for supplying lubricant to said channels whereby lubrication is forced into said channel and through said metering holes to lubricate the internal surface of said member.

4. A lubrication system for a variable pitch diameter sheave comprising: a rotatable shaft having a plurality of arcuately spaced longitudinally extending keyways in its outer surface, a plurality of axially spaced frusto-conical disks concentrically mounted on said shaft, said disks cooperating in pairs to form belt engaging grooves, some of said disks being axially movable relative to said shaft to vary the effective pitch diameter of said grooves, some of said disks combining to define a longitudinally extending keyway in their inner surface, a driving key positioned in one of said keyways in said shaft and extending into said keyway in said disks to transmit power from said shaft to said disks, a plurality of inlaid keys positioned in the other of said keyways in said shaft, each of said inlaid keys combining with the bottom of its respective said keyway to define a longitudinally extending lubricant channel, each of said inlaid keys having a plurality of longitudinally spaced metering holes defined therein, said metering holes extending from the surface of said key adjacent said disks to said lubrication channel, means for supplying lubricant to said channels, whereby lubrication is forced into said channels and through said metering holes to lubricate the internal surface of said disks.

5. A lubrication system for a variable pitch diameter sheave comprising: a rotatable shaft having a plurality of arcuately spaced longitudinally extending keyways in its outer surface, a plurality of axially spaced frusto-conical disks concentrically mounted on said shaft, said disks cooperating in pairs to form belt engaging grooves for V-belts, some of said disks being axially movable relative to said shaft and adjacent said disks to vary the effective pitch diameter of said grooves, some of said disks cooperating to define a longitudinally extending keyway in their inner surface, a driving key positioned in one of said keyways in said shaft and extending into said keyway in said disks to transmit power from said shaft to said disks, a plurality of inlaid keys positioned in the other of said keyways in said shaft, each of said inlaid keys being undercut throughout its entire length and combining with the bottom of its respective said keyway to define a longitudinally extending lubricant channel, each of said inlaid keys having a plurality of longitudinally spaced metering holes defined therein, said metering holes extending from the surface of said key adjacent said disks to said lubrication channel, means for supplying lubricant to said channels, whereby lubrication is forced into said channels and through said metering holes to lubricate the internal surface of said disks.

6. A lubrication system for variable pitch diameter sheaves comprising: a shaft having a plurality of arcuately spaced longitudinally extending keyways in its outer surface, a plurality of frusto-conical disks mounted on said shaft, said disks cooperating in pairs to form belt engaging grooves for V-belts, each of said disks having arcuately spaced longitudinally extending bearing lugs engaging the cylindrical surface of said shaft in sliding relation thereto, adjacent lugs defining therebetween an aperture for receiving an axially extending lug of an adjacent disk, said lugs of alternate said disks being axially aligned and joined together in sets, at least one of said sets being movable axially relative to said shaft, one group of the axially aligned lugs of each set defining a keyway therein, driving keys positioned in two of said keyways in said shaft and extending into said keyways in said sets of axially aligned lugs, inlaid keys being positioned in said other keyways in said shaft, each of said inlaid keys being undercut throughout its entire length and cooperating with its respective said keyway to define a longitudinally extending lubricant channel, each of said inlaid keys having a plurality of radially extending metering holes extending from the surface of said inlaid key adjacent said bearing lugs to said lubricant channel, means for supplying lubricant to said lubricant channels, whereby lubricant is forced into said sheave and through said lubricant channels outward through said metering holes to the surface of said lugs engaging said shaft.

7. In a variable pitch diameter sheave the combination comprising: a shaft having a plurality of arcuately spaced longitudinally extending keyways in its outer surface, a plurality of frusto-conical disks mounted on said shaft, said disks cooperating in pairs to form belt engaging grooves for V-belts, each of said disks having arcuately spaced longitudinally extending bearing lugs engaging the cylindrical surface of said shaft in sliding relation thereto, adjacent said lugs defining therebetween an aperture for receiving an axially extending lug of an adjacent disk, said lugs of alternate said disks being axially aligned and having a bolt hole extending longitudinally therethrough, a bolt extending through said bolt holes to join said alternate disks in sets for axial movement in unison, means connected to said sets for moving said disks axially along said shaft, one group of the axially aligned lugs of each set defining a keyway therein, driving keys positioned in two of said keyways in said shaft and extending into said keyways in said sets of axially aligned disks, inlaid keys being positioned in said other keyways, each of said inlaid keys being undercut throughout its entire length and cooperating with its respective keyway to define a longitudinally extending lubricant channel in said shaft, each of said inlaid keys having a plurality of radially extending metering holes extending from the surface of said inlaid key adjacent said bearing lugs to said lubricant channel, a source of lubricant, means for supplying said lubricant to said lubricant channels, the size of said metering holes removed from said source being larger than said metering holes closer to said source, whereby lubricant is forced into said sheave and through said lubricant channels and is distributed in substantially equal quantities through said metering holes to the surface of said lugs bearing on said shaft.

References Cited in the file of this patent

UNITED STATES PATENTS

| | | |
|---|---|---|
| 2,532,124 | Shaw | Nov. 28, 1950 |
| 2,678,567 | Otto | May 18, 1954 |
| 2,690,677 | Otto | Oct. 5, 1954 |